Nov. 7, 1961  H. GANG  3,007,633
TOTAL TAKING MECHANISM FOR CRAWL-CARRY ACCUMULATORS
Filed Oct. 29, 1957  6 Sheets-Sheet 1

FIG. 1

INVENTOR.
HERMAN GANG
BY
*George V. Hall*
ATTORNEY

Nov. 7, 1961            H. GANG            3,007,633

TOTAL TAKING MECHANISM FOR CRAWL-CARRY ACCUMULATORS

Filed Oct. 29, 1957            6 Sheets-Sheet 2

FIG. 2

INVENTOR.
HERMAN GANG
BY George V. Hall
ATTORNEY

Nov. 7, 1961 H. GANG 3,007,633
TOTAL TAKING MECHANISM FOR CRAWL-CARRY ACCUMULATORS
Filed Oct. 29, 1957 6 Sheets-Sheet 3

INVENTOR.
HERMAN GANG
BY George V. Hall
ATTORNEY

Nov. 7, 1961 H. GANG 3,007,633
TOTAL TAKING MECHANISM FOR CRAWL-CARRY ACCUMULATORS
Filed Oct. 29, 1957 6 Sheets-Sheet 4

FIG. 4

INVENTOR.
HERMAN GANG
BY
ATTORNEY

INVENTOR.
HERMAN GANG

United States Patent Office 3,007,633
Patented Nov. 7, 1961

3,007,633
TOTAL TAKING MECHANISM FOR
CRAWL-CARRY ACCUMULATORS
Herman Gang, Morris Plains, N.J., assignor to Monroe
Calculating Machine Company, Orange, N.J., a corporation of Delaware
Filed Oct. 29, 1957, Ser. No. 693,197
9 Claims. (Cl. 235—60.31)

This invention relates to total taking means for accounting machines, and more particularly to novel devices for taking totals from crawl carry type accumulators of such machines.

Prior art devices for taking totals from crawl carry accumulators control the digital registering mechanism in subtractive operation to zeroize the accumulator wheels successively from lower to higher orders, and accordingly to move the digital type members to printing line position. Furthermore, the zero stop members for the wheels are moved successively from ineffective to effective position in time with the successive zeroizing of the wheels.

The successive zeroizing operation of each wheel removes the partial tens transfer from the next higher order wheel before the registering mechanism for said higher order wheel is operated. Thus each type member is moved to the correct full digital aligned position. The successive movement of the zero stops to effective position is timed so that each stop is positioned after the partial tens transfer has been removed from the associated wheel. Otherwise in certain instances, a stop would be moved to position to arrest a wheel in an approximate zero registering position but which position only immediately approaches zero, e.g., 9.99 in which instance the type member would be arrested in 0 printing position instead of being moved to the correct 9 printing position. Following the successive zeroizing operation, the machine is operated to effect the printing operation and then to restore the registering mechanism.

The successive zeroizing operation, which is fully disclosed in its basic concept in Patent #1,867,002 is obviously time consuming. Means for speeding the successive zeroizing operation is disclosed in Patent #2,261,341. Nevertheless, the inherent character of the operation limits the degree to which it may be speeded.

It is accordingly the primary object of the invention to provide means for substantially increasing the speed of total taking operations from crawl carry accumulators.

Another object of the invention is to provide total taking mechanism for crawl carry accumulators which is more rapid in operation but which is not of increased complexity.

Other objects and advantages of the invention will hereinafter be evident.

To achieve the increased rapidity of the total taking operation, the devices of the invention permit simultaneous zeroizing of the accumulator wheels by the registering mechanism rather than the heretofore successive operation; the simultaneous zeroizing operation being effected in conjunction with total stops which, during the operation, are automatically adjustable angularly with respect to the wheels. The invention, however, will best be understood from the following description with reference to the accompanying drawings in which:

The invention is shown as applied to an adding subtracting listing machine of well-known type such as that disclosed in its essential features in Patent #1,932,013.

*The crawl carry accumulator*

The crawl carry accumulator is of the type disclosed in Patent #1,828,180. As disclosed in this patent, the ordinal series of numeral wheel units 1 (FIGS. 1, 3, 4) are mounted on a shaft 2. An accumulator having less than the usual number of wheel units is shown in the drawings for lack of space. Each unit 1 comprises a digital input pinion 3 which is fixed to a coupling member 4 which engages another coupling member 4a. A floating gear 5 is fixed to member 4a and is accordingly driven at a one to one ratio by pinion 3.

Floating gear 5 engages internal teeth of a numeral wheel 7 and with coupling member 4a is rotatably mounted on an eccentric 8 which is fast upon a sleeve extending from the next lower order numeral wheel 7. Movements of digital input pinion 3 are transmitted to numeral wheel 7 by rotary movement of floating gear 5 and at the same time rotation of eccentric 8 fixed for rotation with the wheel will carry the next higher order floating gear 5 in an orbit within the teeth of its numeral wheel gear 7, resulting in a movement of this higher order wheel one-tenth that of the lower order wheel. Thus digital and tens transfer movement is merged in each higher order wheel. As there is no tens transfer movement imparted to the lowest order wheel 7, eccentric 8 on which floating gear 5 of that order is mounted, is locked against rotation. Accordingly, the sleeve of the eccentric is fast with a disc 9 which is restrained from rotation by a comb 10 having a series of teeth 10a one of which engages a slot in the edge of said disc.

Included in each numeral wheel unit 1 is a small cam 11 which is fixed on the left side face of numeral wheel 7 for rotation therewith. Cams 11 are operable in connection with the total taking operation later described.

For a complete description of the principles of operation of the tens carry accumulator, reference is made to the aforenoted Patent #1,828,180. The invention however is equally adapted for use with other types of crawl carry accumulators, e.g., the planetary type disclosed in Patent #2,211,736. The invention therefore is not restricted to use with a particular type of crawl carry accumulator but is adapted for use with crawl carry accumulators in general.

*Adding and subtracting*

Amounts set on digit keys 13 (FIG. 1) for each denominational order are transferred additively or subtractively, upon operation of plus and minus keys (not shown) respectively, to accumulator wheels 7 by means of a series of spring operated differential actuators 14 loosely mounted on a transverse shaft 15. A forward arm of each differential actuator 14 is provided with segmental rack teeth adapted to mesh with pinions 3 of the series of accumulator wheel units 1. Index bars 16 are pivotally connected with upper arms of actuators 14, these index bars being moved, upon counterclockwise rotation of the actuators, into engagement with the stems of selectively depressed keys 13. Type bars 17 are pivotally connected to rear arms of actuators 14, each type bar being provided with a longitudinally disposed series of type representing the digits 0 to 9.

The digit keys 13 which have been depressed are latched in position with the bottoms of their stems in the path of movement of related stop lugs of bars 16, allowing the bars to advance a distance proportional to the value of the key, upon operation of the machine. Depression of a digit key 13 will also remove a column latch 19 from the path of movement of the associated bar 16, these latches preventing movement of a bar 16 and actuator 14 in any column in which no key is depressed.

Actuators 14 are held in their normal clockwise position against tension of their springs 20 by a bail 21 engaging the under edges of the forward arms of said actuators and extending transversely between right and left side members of a rocker frame 22 loosely mounted on shaft 15. Frame 22 is normally held in clockwise position against the urge of a spring 23 by a cam 24 fast on a rock shaft 25.

Shaft 25 (FIGS. 1, 2) is rocked by a rock arm 26 which is connected by a link 27 to a crank 28 comprising the driven member of a cyclically operable clutch 30. Upon each cycle of operation of clutch 30, crank 28 will reciprocate link 27 forwardly and rearwardly. Consequently arm 26 will rock shaft 25 and cam 24 counterclockwise and return upon each cycle of clutch 30.

As cam 24 is rocked counterclockwise, frame 22 will be permitted likewise movement under the urge of spring 23. Consequently bail 21 will be removed from restraining engagement with actuators 14 and any of the actuators which have been released by depression of digit keys 13 will be allowed to rotate under urge of their springs 20 until they have been stopped by lugs of bars 16 contacting the stems of the depressed keys 13. Upon return movement of cam 24, frame 22 will be restored and bail 21 will engage and return the operated actuators 14 to normal clockwise position. This excursion of actuators 14 serves to register amounts set in the keyboard in accumulator wheels 7 and to move the type bars 17 to corresponding printing positions.

Bail 21 for restraining and restoring actuators 14 replaces a series of latch dogs of the aforenoted reference patents (1,867,002; 1,932,013; 2,261,341), thereby simplifying the structure. The latch dogs are mounted on a frame which operates in accordance with frame 22 and each engages a stud on a respective actuator thereby restraining said actuator. In the total taking operation of these reference patents, the dogs are operated independently of the frame rocking operation to release the actuators successively from lower to higher orders. This successive operation, as aforenoted, is not necessary in the operation of the devices of the invention and therefore individual releasing and restoring means for the actuators are eliminated.

Figure 1:
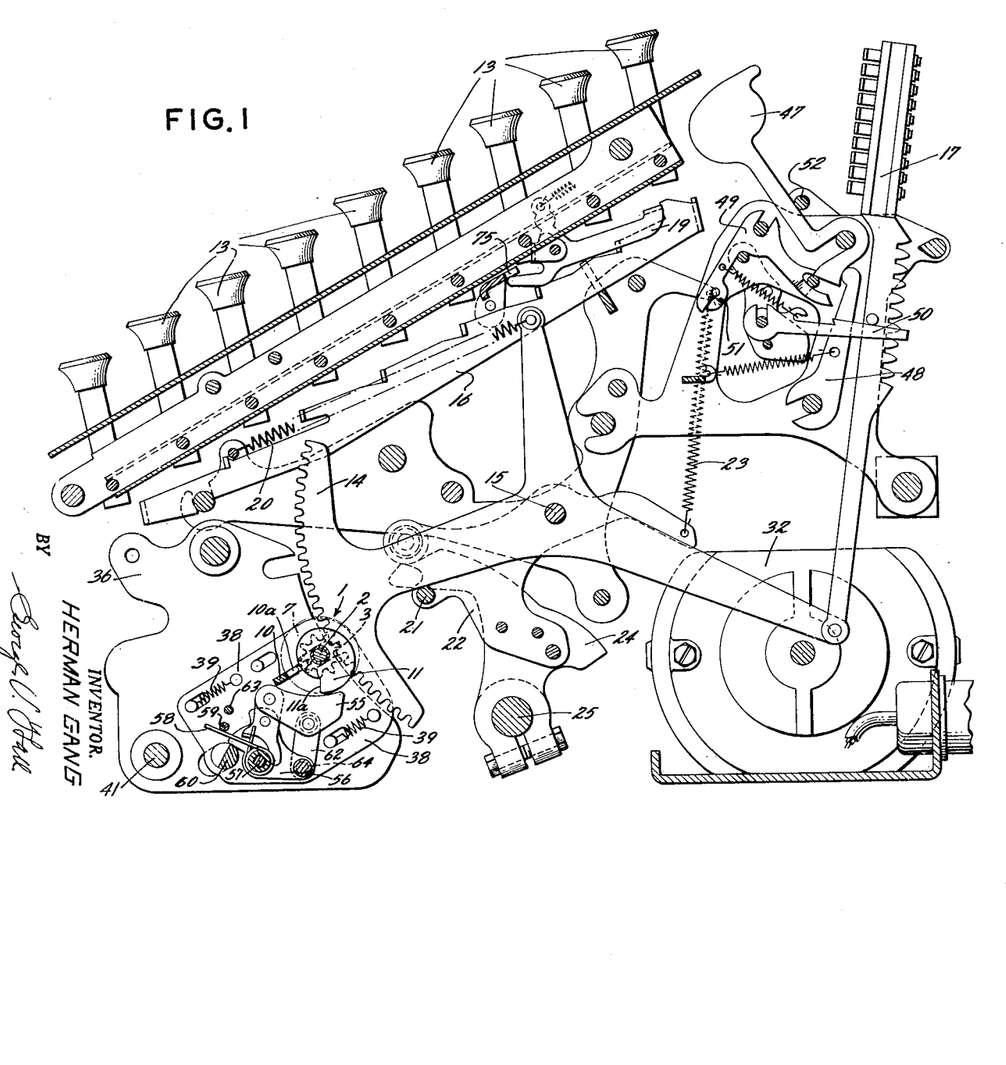
FIG. 1 is a section taken through the keyboard, the registering mechanism and printing mechanism of a listing machine embodying the invention.

Clutch 30 (FIG. 2) comprises a toothed wheel 31 driven through suitable gearing (not shown) by motor 32 (FIG. 1). Wheel 31 is adapted to be engaged by a normally disengaged spring urged clutch pawl 33 which is mounted on the driven clutch member comprising crank 28. Pawl 32 is normally held disengaged by a clutch lever 34 which is spring urged counterclockwise and is held in clockwise clutch disengaging position by a spring urged latch 35.

The plus and minus keys (not shown) through means (not shown) are adapted to release latch 35 thereby releasing lever 34 which will then be spring rocked counterclockwise. Upon counterclockwise movement of lever 34, pawl 32 will be released to engage wheel 31 thereby engaging the clutch for a cycle of operation. As crank 28 of clutch 30 approaches full cycle position in a cycle of operation, an extension 28a thereof will engage a cam edge 34a of lever 34 thereby restoring said lever clockwise where it will be latched by latch 35. Consequently as clutch 30 moves to full cycle position, lever 34 will be engaged by pawl 32 which will be rocked to clutch disengaging position.

During a cycle of operation, numeral wheels 7 (FIGS. 1, 3, 4) of the accumulator are rotated subtractively (clockwise) upon the forward stroke or additively (counterclockwise) upon the return stroke of actuators 14, the timed meshing and unmeshing of the accumulator pinions 3 being controlled as follows and as more fully described in Patent #2,055,623.

Figure 2:
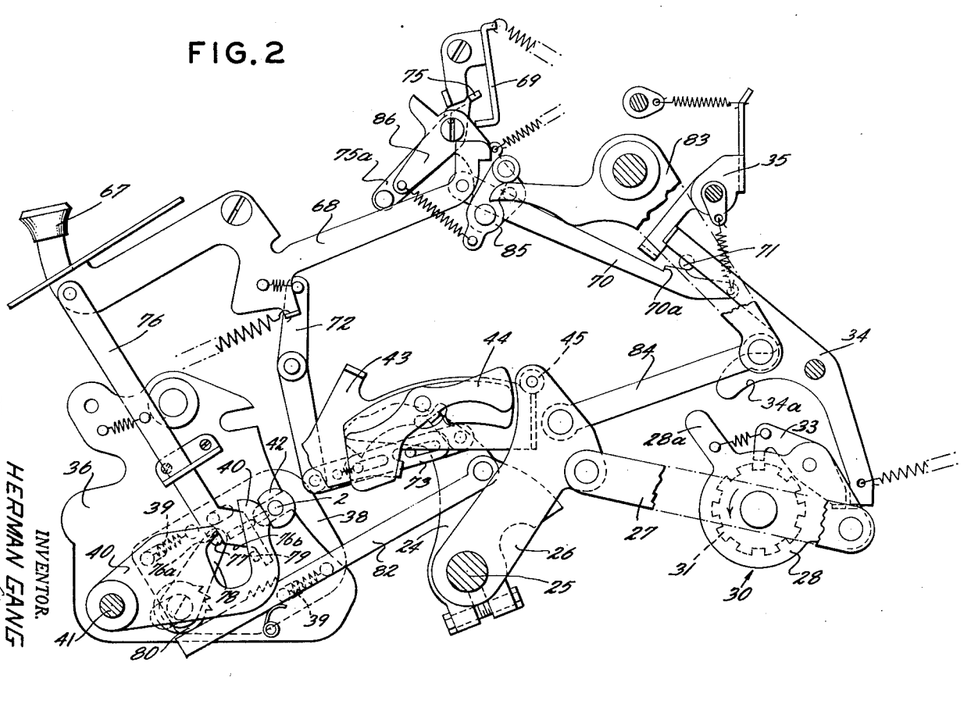
FIG. 2 is a fragmentary right side elevation of the total key, the machine drive and parts operable under control of the key.
Figure 3:
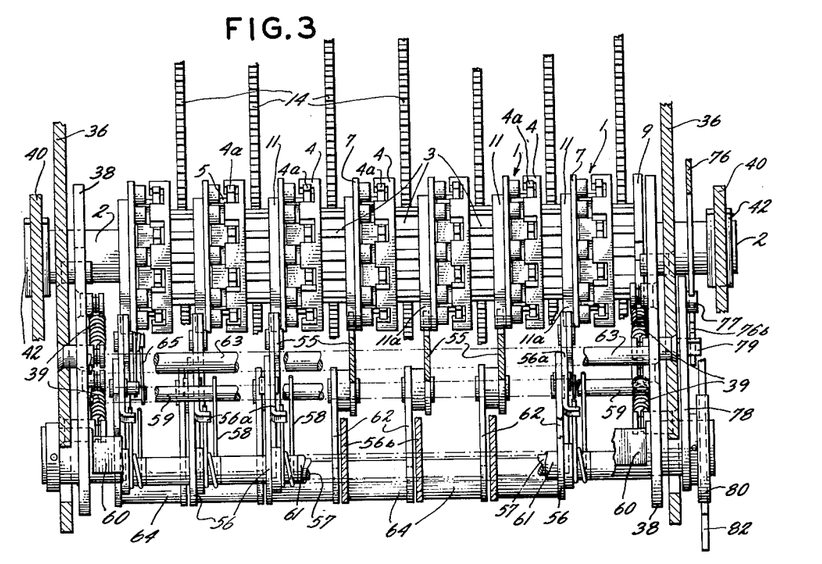
FIG. 3 is a fragmentary front elevation of the accumulator and devices of the invention associated therewith.

The right and left ends of accumulator shaft 2 are mounted in guide slots respectively in right and left frame plates 36 (FIGS. 1, 2, 3). Adjacent the inner faces of the frame plates respectively are adjusting plates 38 through which the ends of shaft 2 snugly extend. Plates 38 have slot and pin mounting on plates 36 and are urged forwardly by springs 39. Normally, however, plates 38 and accumulator shaft 2, extending therethrough, are held toward the rear thereby engaging accumulator pinions 3 with the racks of actuators 14. As will be described later, total taking mechanism of the invention is carried by plates 38 and is therefore maintained in fixed relation with respect to the accumulator.

Figure 4:
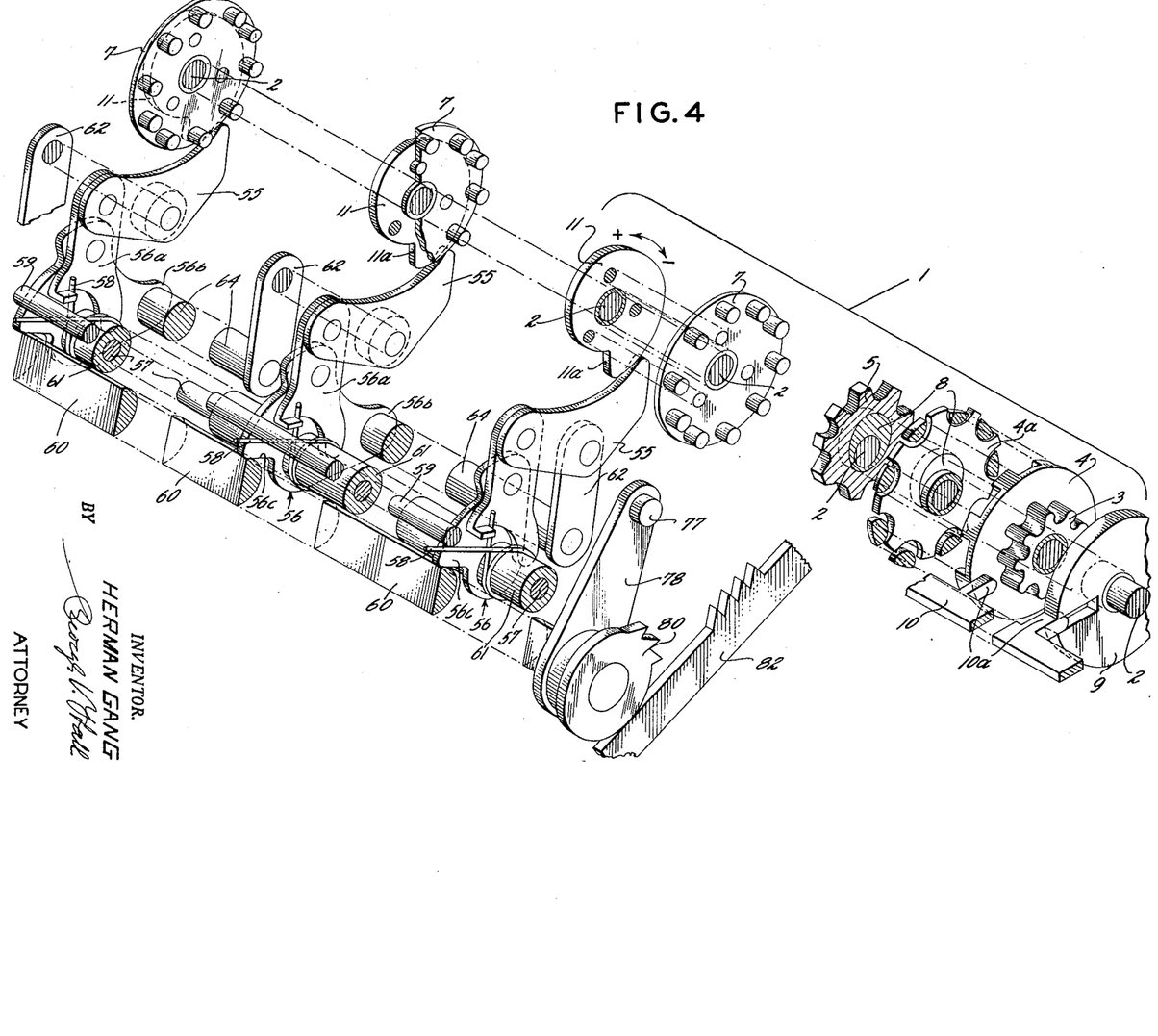
FIG. 4 is a fragmentary exploded perspective of the accumulator wheels and the devices of the invention associated therewith.

Means for holding accumulator shaft 2 and plates 38 normally toward the rear comprises a pair of cam arms 40 (FIGS. 2, 3) located exteriorly of the respective frame plates 36 and fast on the opposite ends of a transverse rock shaft 41. Cam arms 40 respectively engage collars 42 on the opposite ends of accumulator shaft 2. Normally shaft 41 and cam arms 40 are in clockwise position (FIG. 2) and when in this position, the cam ends of arms 40, engaging collars 42, hold shaft 2 and plates 38 to the rear against the urge of springs 39. Conversely when shaft 41 is rocked counterclockwise, the cam ends of arms 40 will release collars 42. As a result, springs 39 will be effective to adjust plates 38 and shaft 2 forwardly thereby disengaging pinions 3 from the actuator racks 14. Upon disengagement of pinions 3 from actuator racks 14, said pinions each will engage a tooth 10a of the aforenoted comb 10 (FIGS. 1, 4). Wheel units 1 are thus locked against rotation.

Comb 10 extends transversely between plates 36 to which it is secured. Suitable slots are provided in adjusting plates 38 through which it extends and to prevent interference with adjustment of said plates. The rightmost tooth 10a (FIG. 4) of comb 10 and the slot of disc 9 which it engages are so related that the engagement is maintained in either the forward or rearward position of accumulator shaft 2.

In an additive cycle of operation, shaft 41 and cam arms 40 will be rocked counterclockwise to disengage pinions 3 from actuators 14 during an initial dwell of the cycle and before actuators 14 are moved in their initial stroke. During the initial stroke of the actuators, pinions 3 will remain disengaged. During a mid-cycle dwell in which actuators 14 are stationary, pinions 3 will be reengaged so that during the return stroke of the actuators additive registration will be effected.

In a subtractive cycle of operation, shaft 41 and cam arms 40 will remain in normal clockwise position until the mid-cycle dwell. Subtractive registration therefore will be effected during the initial stroke of the actuators. During the mid-cycle dwell shaft 41 and cam arms 40 will be rocked counterclockwise to disengage pinions 3. Therefore, actuators 14 will be idly operated during their return stroke. During a terminal dwell, shaft 41 and cam arms 40 will be restored thereby adjusting pinions 3 to normal engaged position.

The means for adjusting shaft 41 and cam arms 40 as described above, comprises an arm 43 (FIG. 2) connected to shaft 41 by means (not shown), a cam switch 44 pivotally mounted on arm 43, and a roller 45 mounted on rock arm 26 and adapted to engage switch 44. In additive operation, switch 44 remains in the normal counterclockwise position of FIG. 2 whereas in subtraction said switch is adjusted clockwise. Reference is made to the aforenoted Patent #2,055,623 for a complete disclosure of the operation of these controls.

Type hammers 47 (FIG. 1) are operated to effect the printing operation during the mid-cycle dwell at which time actuators 14 will have completed their excursions and type bars 17 will be raised to printing position. Type hammers 47 are operated by spring loaded actuators 48 and are normally restrained in tensioned position by latches 49. When a type bar 17 is raised, a spring urged tripping finger 50 is released to move into engagement with the corresponding latch 49, and near the end of the counterclockwise rotation of shaft 25, a frame on which the tripping fingers are mounted is moved forwardly, releasing the hammers from those latches which have been engaged by fingers 50.

In order to print the zero characters in the lower order places wherein no amount from 1 to 9 has been set up, the higher order latches 49 are provided with offsets 51, lying in the planes of and designed to trip the lower order latches. During the return rotation of shaft 25, hammers 47 are restored and relatched by a bail 52 operated through a reciprocatory cam.

The total stops and related control mechanism

It has been noted, with reference to Patents #1,867,002 and 2,261,341, that the total stops of the prior art devices, for arresting subtractive rotation of the crawl carry numeral wheels in zero position in a total taking operation, are adjusted to arresting position successively from lower to higher orders. The movement of these total stops from ineffective position to effective arresting position is substantially radial with respect to the numeral wheels. Furthermore, it has been noted that, but for the successive adjustment of the total stops, the stops would, in certain instances, be adjusted into position to arrest the numeral wheels in positions wherein the type bars would not be raised to the correct printing positions. In other words, the stop lugs on the numeral wheels may be so positioned angularly with respect to the total stops that an incorrect operation would occur.

The devices of the present invention combine angular with radial adjustment of the total stops comprising hooks 55 (FIGS. 4-9) with respect to the stop members comprising snail cams 11 on numeral wheels 7. This operates to permit simultaneous release of the hooks for the adjustment followed by simultaneous subtractive operation of actuators 14. The extent of the radial adjustment of each total hook 55 from a home position is controlled by engagement with snail cam 11 on the associated numeral wheel 7, and the extent of the angular adjustment from said home position is proportional to the extent of the radial adjustment of the next lower order hook. When all of the numeral wheels 7 have been rotated subtractively to zero position in a total taking operation, each of the total hooks 55 will be adjusted from its home position to a like radial and angular position.

With reference to FIGS. 3, 4, the nose of each total hook 55 is located immediately below snail cam 11 of one of the numeral wheels 7. When the wheel is in zero registering position, the nose will just clear the high edge of the cam. Hook 55 extends forwardly and is pivotally mounted at its front at the upper end of an upstanding arm 56a of a crank 56. Cranks 56 are fulcrumed on a transverse shaft 57 which is mounted at its ends respectively in adjusting plates 38 (FIGS. 1, 2).

Each crank 56 is spring biased counterclockwise and its arm 56a pivotally mounted thereon is yieldable counterclockwise. This is effected by a tension spring 58 on a spacing sleeve 61 on shaft 57, one end of which engages the underside of a rod 59 extending transversely between plates 38, and the other end of which engages a lug at the front lower end of arm 56a. Thus arm 56a is yieldably held in normal clockwise position on crank 56 with a depending lower rear end thereof acting as a limit stop by engagement with sleeve 61, while the pressure of the spring end on the lug of said arm 56a biases the crank assembly as a unit counterclockwise. Normally, however, cranks 56 are restrained in clockwise position against the urge of springs 58 by a transverse cam shaft 60 which is fulcrumed adjacent its respective ends in adjusting plates 38 and which extends outwardly at its ends through suitable slots in frame plates 36 (FIGS. 1, 2, 4).

Shaft 60 (FIGS. 4-9) extends transversely below and engages the lower edges of forward extensions 56c of cranks 56. Throughout its length below the extensions of cranks 56, shaft 60 is of semicircular cross section. Normally, shaft 60 is in the counterclockwise position of FIG. 4 with its flat face just removed from engagement with extensions 56c of cranks 56 and its cylindrical face engaging the crank extensions to hold said cranks in normal clockwise position. As later described, shaft 60 is rocked clockwise to remove its cylindrical face from engagement with the extensions of cranks 56 thereby releasing said cranks for counterclockwise adjustment under the urge of springs 58.

Each total hook 55 has connections with crank 56 of the next higher order total hook. These connections include a depending link 62 which is pivotally connected at its upper end intermediate the ends of hook 55, and a leftwardly extending shaft 64 which is pivotally connected at its right end to the lower end of link 62 and connected at its left end to a rearwardly extending arm 56b of crank 56 of the next higher order hook 55. Obviously there is no connection 64 to crank 56 of the lowest order and therefore this crank will be without a rear arm 56b as shown in FIG. 4 or such arm would be disconnected; and likewise there is no connection 62 from the highest order total hook 55.

A full understanding of the devices in a total taking operation will better be understood after a consideration of the operation of a higher order assembly 55—56 with respect to the next lower order assembly with cam shaft 60 rocked clockwise from the position of FIG. 4 to release cranks 56 for counterclockwise movement under urge of their springs 58.

Counterclockwise movement of the higher order crank 56 by its spring 58 will move its total hook 55 forwardly with respect to the associated snail cam 11. Furthermore, this counterclockwise movement will, through rightwardly extending shaft 64, raise the next lower order link 62 and thereby raise the nose of the next lower order total hook 55. The extent to which the nose of the hook will be raised will be determined by the position of the associated snail cam 11. If the highest portion of the cam is in the path of the nose, said nose will be restrained from any appreciable upward movement and higher order crank 56 will be restrained, through the connections, from counterclockwise movement to move its hook 55 forwardly. If, however, the lowest portion of the cam is in the path of the nose, said nose will be afforded maximum upward movement. This maximum upward movement will be effected by maximum counterclockwise movement of higher order crank 56 under urge of its spring 58 and maximum forward movement of higher order total hook 55.

From the above, it will be seen that a higher order total hook 55 will be moved forwardly a distance proportional to the distance that the nose of the next lower order hook is raised, and that said nose will be raised incremental amounts between zero and a maximum in dependence on the position of the associated snail cam 11. From this, it will be evident that the lowest order hook 55 is not subject to this control by a next lower order, and that its rocker 56, when released by shaft 60, will be invariably rocked the maximum distance by its spring 58 to move said lowest order hook forwardly the maximum distance. Furthermore it will be apparent that the highest order hook 55 has no connections 62, 64 with a next higher order spring urged rocker to move it upwardly. Therefore an individual torsion spring 65 (FIG. 3) is provided to bias the highest order hook 55 upwardly.

Total and sub-total

Depression of a total key 67 (FIG. 2) will initiate a subtractive machine cycle and adjust the devices of the invention to controlling position. The stem of key 67 is integral with the front end of a rearwardly extending intermediately fulcrumed lever 68 which is spring biased to normal clockwise position. Upon depression of key 67, lever 68 will be rocked counterclockwise to engage a shoulder at its rear end with a spring urged latch 69. Thus key 67 will be held depressed and lever 68 will be held counterclockwise.

Pivotally mounted at the rear of lever 68, and extending downwardly toward the rear is trip arm 70. The rear free end of arm 70 is spring urged upwardly and is restrained by a guide pin 71. A shoulder 70a, at the upper edge of arm 70 adjacent its right end, normally lies below and to the rear of a depending end of latch 35. Upon depression of key 67 and counterclockwise movement of lever 68, arm 70 will be moved forwardly and its rear end, under control of guide pin 71, will be raised to engage shoulder 70a with latch 35 thereby tripping said latch and releasing clutch lever 34 to engage clutch 30.

Depression of key 67 and counterclockwise movement of lever 68 is operable to set sign control switch 44 to control the ensuing machine cycle for subtractive registration. Upon counterclockwise movement of lever 68, a depending extension thereof, which engages a pin at the upper end of a vertically disposed lever 72, will rock said lever clockwise. The lower end of lever 72 has yieldable link connection 73 with switch 44. Therefore when lever 72 is rocked clockwise, link 73 will be moved forwardly to rock switch 44 clockwise to subtractive controlling position.

During the subtractive total taking operation, the excursion of actuators 14 will be controlled in accordance with the values in accumulator wheels 7 and not by values set on numeral keys 13 (FIG. 1). Therefore upon depression of total key 67 and counterclockwise movement of lever 68, means is provided to release column latches 19. To this end, a bail 75 (FIGS. 1, 2) extends transversely above forwardly extending tails of column latches 19. Bail 75 is integral, at its right end, with a forwardly extending arm 75a which at its end has a roller engaged by the upper edge of the rear arm of lever 68. Consequently when lever 68 is rocked, arm 75a will be raised to rock bail 75 clockwise thereby releasing column latches 19.

Depression of total key 67 is operable to set the devices of the invention to controlling position. A downwardly extending arm 76 is pivotally mounted at its upper end to the front of lever 68 and is spring urged clockwise to normally engage a shoulder 76a adjacent its left lower end with a pin 77 at the end of a crank 78 (FIGS. 2, 3, 4). Crank 78 is fixed on cam shaft 60 adjacent its right end exteriorly of right frame plate 36 and extends upwardly toward the rear. Below shoulder 76a on arm 76 is cam edge 76b and below cam edge 76b the left lower edge of said arm normally engages a stud 79 in plate 36.

Upon depression of total key 67, arm 76 will be moved downwardly. As a result, shoulder 76a engaging pin 77 will rock crank 78 and cam shaft 60 clockwise. When shaft 60 has been rocked a slight distance clockwise, the cylindrical face thereof will be removed from engagement with extensions 56c of cranks 56. This initial movement of shaft 60 will permit counterclockwise movement of cranks 56 under urge of springs 58, and this movement will further rotate shaft 60 to engage extensions 56c with the flat face of said shaft.

Arm 76, in its downward movement after rocking crank 78 and shaft 60, will engage its cam edge 76b with stud 79. This will rock the lower end of arm 76 counterclockwise and move shoulder 76a from the path of movement of pin 77 so that cam shaft 60 may be restored as later described.

The counterclockwise movement of cranks 56 will cause adjustment of total hooks 55 respectively into position to be engaged by shoulders 11a of snail cams 11 of wheels 7 in the total taking operation. To insure a full understanding of the devices of the invention, a number of total taking operations will now be described with numeral wheels 7 initially in certain registering positions for each operation respectively.

Figure 5:
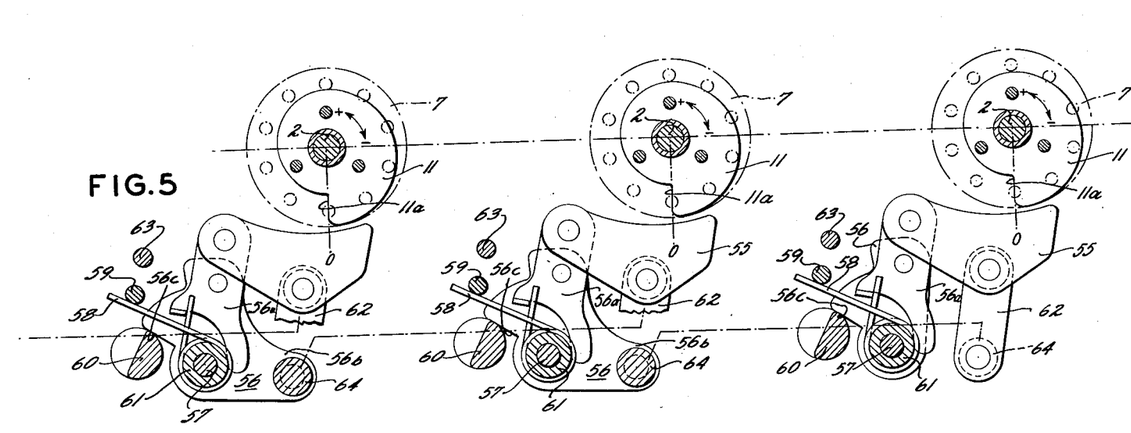
FIG. 5 is a mechanical schematic of a series of the accumulator wheels in zero registering position and the devices of the invention in normal position.
Figure 6:
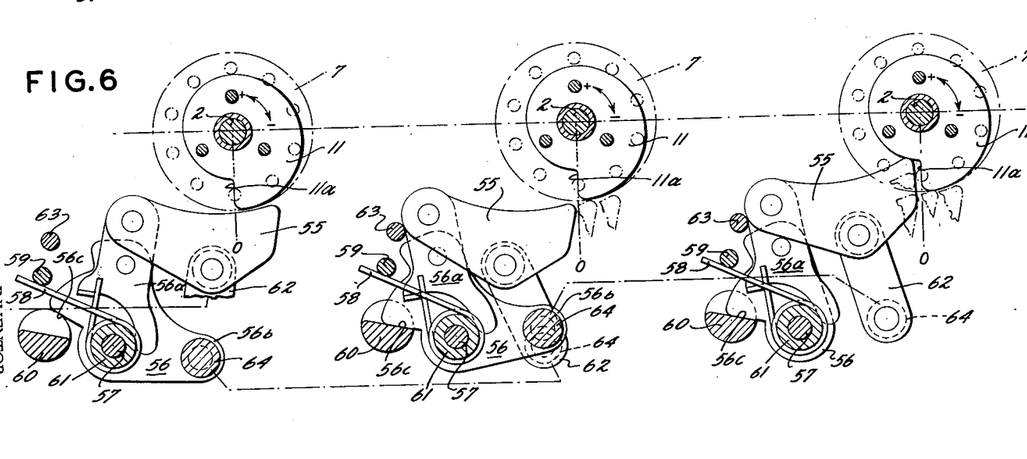
FIG. 6 is a view similar to FIG. 5 with the accumulator wheels in the same registering position and the devices of the invention in an operated position.

With reference to FIGS. 5 and 6, an operation will first be described with all of the numeral wheels 7 initially in zero registering position as indicated by the reference lines extending from shoulders 11a. FIG. 5, which shows the three lowest orders of the accumulator, illustrates the angular and radial relationship of snail cams 11 of numeral wheels 7 with respect to the associated total hooks 55 when rockers 56 of the hooks are restrained in normal clockwise position by cam shaft 60 and said numeral wheels are in zero registering position. When a wheel is in zero registering position, the high portion of its snail cam 11 just clears the upper edge of the associated hook 55 and is therefore in position to block any appreciable upward movement of the nose of said hook. Counterclockwise movement of a rocker 56 to the extent of engagement with limit shaft 63, as shown by the units order of FIG. 6, will move the connected hook 55 forwardly a distance just sufficient for the nose of said hook to clear shoulder 11a of the associated cam 11. When this has happened, the nose of the hook will be raised to engage the low portion of cam 11, this operation being effected by counterclockwise movement of the tens order rocker 56 through the connections, and this counterclockwise movement being just sufficient to move the tens order hook 55 forwardly to clear shoulder 11a of its cam 11. Consequently when cam shaft 60 is rocked to release rockers 56 with wheels 7 in zero position, the operation will be as follows.

With reference to FIG. 6, the units order rocker 56 will be immediately rocked to its full extent for the reason that there are no controlling connections from a next lower order total hook 55. The units order hook 55 will therefore be raised to engage the low portion of its snail cam 11 by rocking movement of tens order rocker 56 which will move its hook into position to be raised by rocking of the hundreds order rocker as shown in the drawings. Hooks 55 therefore will be moved successively from lower to higher orders from the high to the low portions of the respective snail cams 11. This operation will be initiated immediately upon depression of total key 67 and will be completed during the initial dwell of the machine drive before actuators 14 are released by bail 21 (FIG. 1).

When actuators 14 are released by bail 21 for subtractive operation, the noses of hooks 55, immediately adjacent shoulders 11a of cams 11, will restrain numeral wheels 7 from subtractive rotation. Therefore actuators 14 and type bars 17 will be restrained in zero position for the usual printing operation which occurs during the mid-cycle dwell of the machine registering cycle.

During the return stroke of the registering cycle, means is operable to restore total hooks 55 and the associated parts. A mutilated ratchet wheel 80 (FIGS. 2, 4) is fast on cam shaft 60 to the right of crank 78. A ratchet arm 82 is pivotally mounted at its rear to rock cam 24 and extends forwardly below ratchet wheel 80. Arm 82 has a series of ratchet teeth normally located to the rear of wheel 80 and is spring urged upwardly to engage its upper edge adjacent its free end with the lower untoothed edge of wheel 80, the teeth of said wheel being normally counterclockwise from engagement with said arm.

When cam shaft 60 is rocked clockwise upon depression of total key 67, ratchet wheel 80 will likewise be rotated and its teeth will pass idly over the untoothed upper edge of arm 82. When cam 24 is rocked counterclockwise during the initial stroke of the machine drive, arm 82 will be moved forwardly and the teeth thereof will be moved idly to the front of the teeth of wheel 80. When cam 24 is restored on the return stroke of the machine drive, arm 82 will be restored to the rear and its teeth will engage the teeth of wheel 80 thereby restoring said wheel and cam shaft 60 counterclockwise. During this operation, the accumulator will be disengaged from actuators 14. Plates 38 and cam shaft 60 will therefore be in forwardly adjusted position. To compensate for this adjustment, arm 82 will be moved forwardly a distance which will position its teeth forwardly of the teeth of ratchet wheel 80 when shaft 60 and the ratchet wheel are in forward position.

Cam shaft 60, when restored counterclockwise, will restore all of the rockers 56 to normal clockwise position. As each rocker 56 is restored, it will urge its total hook 55 rearwardly against shoulder 11a of the associated cam 11, and rocker arm 56a therefore will yield counterclockwise. At the same time, the total hook will be lowered by the restoring movement of the next higher order rocker 56. When the nose of the total hook has been lowered from engagement with shoulder 11a, spring 58 will straighten arm 56a thereby moving the total hook rearwardly to normal position below the high portion of cam 11.

As the machine completes the subtractive registering cycle, means is operable to release latched down total key 67 (FIG. 2). This means includes a lever 83 having link connection 84 with rock arm 26. During the initial stroke of the machine cycle, a finger of lever 83 will pass clockwise beyond a yieldable click pawl mounted on a lever 86 which is spring held counterclockwise. Near the end of the cycle as lever 83 is restored counterclockwise, its finger will engage pawl 85 and rock lever 86 clockwise. Upon clockwise movement of lever 86, an upwardly extension thereof will move latch 69 to release lever 68. Total key 67 therefore will be retracted to restore the parts operated thereby to normal.

Figure 7:
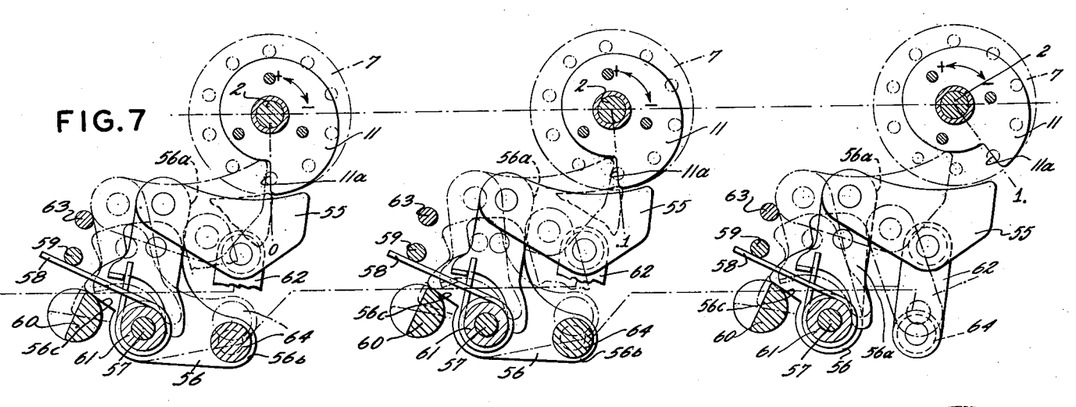
FIG. 7 is a mechanical schematic of a series of the accumulator wheels with a given digital value registered in the units order with the devices of the invention in normal position and shown in a dot-dash line operated position.

With reference to FIG. 7, the operation will now be described with the units order wheel 7 in 1 registering position and with only the crawl carry registration in the next higher order wheels. The positions of the wheels are indicated by the reference lines extending from shoulders 11a. With 1 in the units order, the tens order wheel will stand at .1 and the hundreds order wheel at .01 which for all practical purposes may be considered zero.

Upon release of rockers 56 by cam shaft 60, the units order rocker will be rocked to its full extent and its hook 55 will be raised by the rocking of the tens order rocker, as shown by the dot-dash lines, to engage its snail cam 11. The tens order rocker 56, however, will not be permitted its full extent of movement for the reason that the units order hook 55 will not engage the lowest part of its snail cam 11, but will engage a part of the cam approximately 36° or the angular distance of one unit of registration clockwise from shoulder 11a. As a result the tens order hook 55 will not be afforded the full extent of its forward movement. Nevertheless, the tens order snail cam 11 will be rotated counterclockwise to .1 registering position and this will bring its shoulder 11a just clear of the nose of the tens order hook 55 to permit said hook to be raised by the hundreds order rocker 56 which will move its hook forwardly into position to be raised.

Figure 8:
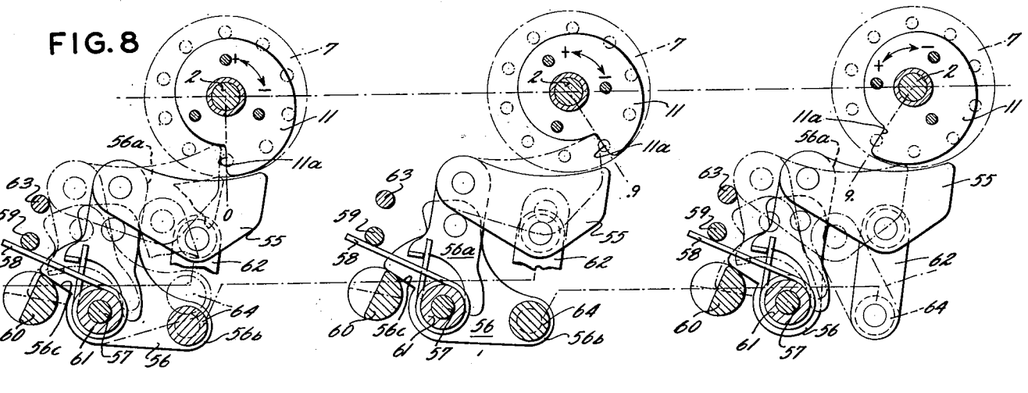
FIG. 8 is a view similar to FIG. 7 with another digital value registered in the units order wheel.

With reference to FIG. 8, the operation will next be described with the units order wheel 7 in 9 registering position and with only the crawl carry registration in the next higher order wheels. The positions of the wheels are indicated by the reference lines extending from shoulders 11a. With 9 in the units order, the tens order wheel will stand at .9 and the hundreds order wheel at .09.

Upon release of rockers 56 by cam shaft 60, the units order rocker will be rocked to its full extent and its hook 55 will be raised by the urge of the tens order rocker as shown by the dot-dash position. The tens order rocker 56, however, will be permitted substantially no movement for the reason that the units order hook will almost immediately be blocked from raising movement by substantially the highest portion of its cam 11. Nevertheless the tens order snail cam 11 will be rotated counterclockwise to .9 registering position and this will bring its shoulder 11a just clear of the nose of the tens order hook 55 to permit said hook to be raised, as shown by the dot-dash position, by the hundreds order rocker 56 which will move its hook forwardly into position to be raised.

Figure 9:
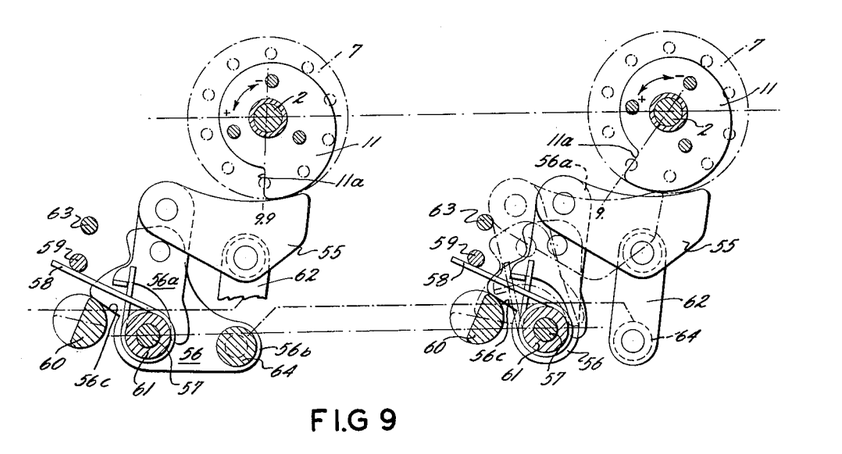
FIG. 9 is a view similar to FIG. 7 with a given digital value registered in the units order wheel and the same digital value registered in the tens order wheel.

FIG. 9 illustrates the operation with a registration of 9 in the units order wheel 7 and 9.9 in the tens order wheel. The positions of the wheels are indicated by the reference lines extending from shoulders 11a. Upon release of rockers 56 by cam shaft 60, the units order rocker will be rocked to its full extent, as shown by the dot-dash position, and its hook 55 will be raised by the urge of the tens order rocker. The tens order rocker 56, however, will be permitted substantially no movement and its hook 55 will not be moved forwardly because the units order hook will immediately engage the high portion of its cam 11 which will be in its path of movement. The tens order hook will be raised under urge of the hundreds order rocker (not shown). It will be observed that the tens order wheel standing at 9.9 registering position is angularly displaced with respect to the units order wheel standing at 9 registering position. However, the tens order hook is not moved forwardly as is the units order hook, and therefore it will engage the high portion of its cam wherein its nose will be positioned in the same angular relationship with respect to shoulder 11a of its cam as is positioned the nose of the units order hook with respect to shoulder 11a of its cam 11.

From the foregoing, it will be seen that when a wheel 7 stands in a registering position of less than 1, i.e., zero or in a partial tens carry position, regardless of the position, total hook 55 and snail cam 11 will always be adjusted to substantially the same angular relationship wherein the nose of the hook will be positioned so that it will be raised into position to be immediately engaged by shoulder 11a of the cam upon subtractive movement of the wheel. Furthermore, it will be seen that when a wheel is moved to a given 1 to 9 digital value registering position or additionally to a partial tens carry position, the nose of hook 55 will be adjusted to the same angular position with respect to shoulder 11a for a given digital value regardless of partial tens carry registration.

Numeral wheels 7, in which the registered value is 1 or greater, will be rotated simultaneously toward zero by subtractive operation of actuators 14 (FIG. 1) through pinions 3 in a total taking operation. Actuators 14, however, will be ineffective to rotate those wheels in which there is only partial tens carry registration. This rotation is prevented by hooks 55 which invariably will be in engagement with shoulders 11a of cams 11 when the initial registration is only a partial tens carry as previously described. Consequently type bars 17 in these orders will not be raised from zero position.

During rotation of a wheel 7 toward zero by an actuator 14, the associated hook will be progressively engaged by a lower portion of snail cam 11 while at the same time the partial crawl carry will be backed out of the next higher order wheel. As a result, the higher order rocker 56 will be progressively rocked toward its extreme position thereby moving its hook 55 forwardly with shoulder 11a of its cam 11 maintained in engagement therewith as said cam is rotated by subtractive movement of its wheel 7 by removal of the partial crawl carry.

It will be observed that the partial crawl carry will be removed at the precise rate to maintain shoulder 11a in engagement with hook 56 as it moves forwardly, and that the two movements are interdependent and occur simultaneously. Furthermore, the resistance of hook 56 to the rotational urge of shoulder 11a, as the partial crawl carry is removed, causes a counter force through the differential of the wheel which tends to rotate pinion 3 reversely to the urge of actuator 14 engaging said pinion. For this reason, actuator 14 will be ineffective to move the wheel through the pinion and thus raise the type bar. When all of the wheels 7 have been rotated to zero position, they will be arrested from further movement by hooks 56 which will be in their forward most positions with rockers 56 in engagement with limit shaft 63, and type bars 17 will be raised to the correct printing positions.

When a wheel registers a 1–9 digital value and in addition a partial crawl carry, the operation will be as follows. The wheel will be rotated by actuator 14 until the full digital value has been subtracted. If at this time, the crawl carry has been removed by zeroizing of the next lower order wheel, the wheel will be arrested in zero position by its hook 56. If however at this time, a partial crawl carry remains in the wheel, shoulder 11a of its cam 11 will be brought into engagement with its hook 55 to prevent further movement of actuator 14. After this, the operation will be completed as described when there is initially only a partial crawl carry registration in a wheel.

In taking a sub-total, values registered in wheels 7 are retained and therefore pinions 3 (FIG. 1) remain in engagement with actuators 14 during both their initial and return stroke. Therefore upon depression of a sub-total key (not shown) sign control switch 44 (FIG. 2) will be set for a non-add operation as described in reference Patent No. 2,055,623. Otherwise the sub-total key will set the controls substantially as described upon depression of total key 67.

Although the invention is disclosed as embodied in a particular type of listing machine, it is equally applicable for use in other types of machines. The invention therefore is to be restricted only as necessitated by the scope and spirit of the appended claims.

I claim:

1. In a machine of the class described having an ordinal series of numeral wheels and crawl tens transfer mechanism between said wheels; a snail cam rotatable with each of said wheels, a series of stops each having a free end adapted for engagement with one of said snail cams, a series of pivoted bell cranks each having one arm pivotally connected to the end of one of said stops opposite its free end to adjust said stop peripherally of its cam and having its other arm pivotally connected intermediate the ends of the next lower order stop to move said stop radially of its cam, and resilient means for urging each of said cranks about its pivot to engage the free end of the lower order stop with which it is connected with the associated snail cam and thereby adjust the higher order stop peripherally of its cam.

2. In a machine of the class described having an ordinal series of numeral wheels and crawl tens transfer mechanism between said wheels; a zero stop rotatable with each wheel, a total stop for each wheel adjustable for engagement by said zero stop of said wheel when said wheel is in 0 position or in any partial tens transfer position between 1 and 0, and means controlled by the lower order wheel of each pair of adjacent order wheels to adjust the total stop of the higher order wheel of said pair for engagement by the zero stop of said higher order wheel when said higher order wheel is in a registering position substantially corresponding to the partial tens transfer registration imparted thereto.

3. The invention according to claim 2 wherein the means controlled by said lower order wheel of each pair of adjacent order wheels includes the zero stop of said lower order wheel.

4. In a machine of the class described having an ordinal series of numeral wheels and crawl tens transfer mechanism between said wheels; a zero stop rotatable with each wheel, a total stop for each wheel adjustable for engagement by said zero stop of said wheel when said wheel is in 0 position or in any partial tens transfer position between 1 and 0, and means controlled by the lower order wheel of each pair of adjacent order wheels upon rotation thereof to adjust the total stop of the higher order wheel of said pair for engagement by the zero stop of said higher order wheel as said higher order wheel is rotated from a partial tens transfer position between 1 and 0 to 0 position by the crawl tens transfer movement imparted thereto by said lower order wheel.

5. In a machine of the class described having an ordinal series of numeral wheels and crawl tens transfer mechanism between said wheels; a zero stop rotatable with each wheel, a normally disabled adjustable total stop for each wheel adapted for engagement by said zero stop of said wheel, means operable to adjust said total stops to enabled position, and means controlled by the lower order wheel of each pair of adjacent order wheels upon adjustment of its total stop to enabled position to adjust the total stop of the higher order wheel of said pair angularly with respect to the path of rotation of the zero stop of said higher order wheel a distance proportional to the registering position of said lower order wheel.

6. In a machine of the class described having an ordinal series of numeral wheels and crawl tens transfer mechanism between said wheels; a zero stop rotatable with each wheel, a normally disabled adjustable total stop for each wheel adapted for engagement by said zero stop of said wheel, means operable to adjust said total stops to enabled position, and means controlled by the lower order wheel of each pair of adjacent order wheels upon adjustment of its total stop to enabled position to adjust the total stop of the higher order wheel of said pair in position for engagement by the zero stop of said higher order wheel when said higher order wheel is in the registering position corresponding substantially to the partial tens transfer imparted thereto.

7. In a machine of the class described having an ordinal series of numeral wheels and crawl tens transfer mechanism between said wheels; a zero stop rotatable with each wheel, an adjustable total stop for each wheel adapted for engagement by said zero stop of said wheel, means for adjusting each total stop radially inward with respect to the associated wheel into the path of rotation of said zero stop of said wheel a distance proportional to the registering position of said wheel, and means for adjusting each total stop angularly with respect to the path of rotation of the zero stop of the associated wheel a distance proportional to the radial adjustment of said total stop of the next lower order wheel.

8. The invention according to claim 7 wherein said means for adjusting each total stop radially inward with respect to the associated wheel includes a snail cam mounted on said wheel.

9. In a machine of the class described having an ordinal series of numeral wheels and crawl tens transfer mechanism between said wheels; a zero stop comprising a snail cam rotatable with each wheel, an adjustable total stop adapted for engagement with the snail cam of each wheel, mounting means for permitting radial movement of each total stop inwardly into engagement with the periphery of the associated snail cam and angularly with respect to said periphery, connections between the total stops of each pair of adjacent order wheels operable upon radial movement of the total stop of the lower order wheel of said pair to effect a proportional angular movement of the total stop of the higher order wheel of said pair, and resilient means for biasing each total stop radially and angularly.

References Cited in the file of this patent
UNITED STATES PATENTS 2,311,454  Mixer ________________ Feb. 16, 1943

UNITED STATES PATENT OFFICE
CERTIFICATE OF CORRECTION

Patent No. 3,007,633                              November 7, 1961

Herman Gang

It is hereby certified that error appears in the above numbered patent requiring correction and that the said Letters Patent should read as corrected below.

Column 2, line 53, for "small" read -- snail --.

Signed and sealed this 29th day of January 1963.

(SEAL)
Attest:

ERNEST W. SWIDER
Attesting Officer

DAVID L. LADD
Commissioner of Patents